US012567964B2

(12) United States Patent
Richardson

(10) Patent No.: US 12,567,964 B2
(45) Date of Patent: Mar. 3, 2026

(54) SYSTEM AND METHOD FOR SECURE STORAGE USING OFFLINE PUBLIC KEYS

(71) Applicant: Ric B Richardson, Broken Head (AU)

(72) Inventor: Ric B Richardson, Broken Head (AU)

( * ) Notice: Subject to any disclaimer, the term of this patent is extended or adjusted under 35 U.S.C. 154(b) by 65 days.

(21) Appl. No.: 18/577,474

(22) PCT Filed: Jul. 8, 2022

(86) PCT No.: PCT/AU2022/050720
§ 371 (c)(1),
(2) Date: Jan. 8, 2024

(87) PCT Pub. No.: WO2023/279171
PCT Pub. Date: Jan. 12, 2023

(65) Prior Publication Data
US 2024/0364514 A1     Oct. 31, 2024

(30) Foreign Application Priority Data

Jul. 8, 2021    (AU) ................................ 2021902088

(51) Int. Cl.
*H04L 9/14*         (2006.01)
(52) U.S. Cl.
CPC ...................................... *H04L 9/14* (2013.01)
(58) Field of Classification Search
CPC ......... H04L 9/14; H04L 9/0825; H04L 9/085;
H04L 9/0894; H04L 9/3255; H04L 9/32;
H04L 9/30; H04L 63/045; G06Q
2220/00; G06Q 50/265; G06Q 50/18;
G06F 21/602; G06F 21/6218; G06F
21/6209
See application file for complete search history.

(56) References Cited

U.S. PATENT DOCUMENTS

| | | | |
|---|---|---|---|
| 9,258,122 B1 * | 2/2016 | Zhang ................... | G06F 16/148 |
| 11,507,283 B1 * | 11/2022 | Olson ................... | G06F 16/909 |
| 12,135,811 B2 * | 11/2024 | Fox-Epstein ....... | G06F 21/6218 |

(Continued)

FOREIGN PATENT DOCUMENTS

EP            0950972 A1    10/1999

OTHER PUBLICATIONS

Anonymous, <https://medium.com/ecomi/keep-your-private-keys-safe-why-its-so-important-to-store-them-offline-8a85d946a3b2> <accessed on: Jan. 8, 2024>.

*Primary Examiner* — Abiy Getachew
(74) *Attorney, Agent, or Firm* — Hayes Soloway P.C.

(57)            ABSTRACT

A method of storing at least one Digital data item of a user characterized by proof of identity data. The method includes constructing a data pool. The data pool has a digital data record with the at least one digital data item and said proof of identity data. An ID number selected by the user is associated with the data pool. The data pool uses a symmetric key of a symmetric encryption algorithm to form a symmetric encrypted data pool. The symmetric key is encrypted using a public key of an asymmetric encryption algorithm to form an asymmetric encrypted symmetric key. The symmetric encrypted data pool is stored on a server referenced against and together with the ID number and the asymmetric encrypted symmetric key and the public key. The server selectively connects to the Internet storing in an off-line storage facility the public key and its associated private key.

12 Claims, 7 Drawing Sheets

123

(56) References Cited

U.S. PATENT DOCUMENTS

| | | | | |
|---|---|---|---|---|
| 2014/0143543 | A1* | 5/2014 | Aikas | H04L 67/1097 |
| | | | | 713/168 |
| 2019/0318356 | A1 | 10/2019 | Martin et al. | |
| 2020/0341689 | A1* | 10/2020 | Smith | G06F 3/0614 |

* cited by examiner

SYSTEM AND METHOD FOR SECURE STORAGE USING OFFLINE PUBLIC KEYS

CROSS-REFERENCE TO RELATED APPLICATIONS AND PRIORITY

This patent application claims priority from PCT Application No. PCT/AU2022/050720 filed Jul. 8, 2022, which claims priority from Australian Patent Application No. 2021902088 filed Jul. 8, 2021. Each of these patent applications are herein incorporated by reference in its/their entirety.

OVERVIEW

The invention is a public key data encryption and retrieval system that uses state of the art encryption with a human/operator with security and legal training to verify identity before releasing the protected data back to the owner or their representative[1].

[1] For example, a person wishing to access the data after probate/death of the owner or a company officer in the event the data was saved by a person on behalf of a company and has since left the company.

The invention is unique in that it does not require authentication or identity verification of the data submitter to add data to the secured data pool but only insists on identity verification for data retrieval to occur.

BACKGROUND

Public key encryption using a single key pair for secure recipient retrieval, and public-key encryption using two key pairs for sender authentication and secure recipient retrieval are known in the art. Both techniques are used for secure storage of data and communications.

A problem associated with such systems is the safe storage of the private keys in each instance. Private keys represent a secret that the data owner keeps and never shares in order to securely send and receive encrypted data.

This is especially troublesome for many users who have the frequent problem of losing private keys stored on private devices that are lost, stolen or erased. Important information such as passwords, cryptocurrency wallet keys and other sensitive and valuable data is often stored using security measures that are dependent on the user saving a password in their home, on a device or using an automated service such as a password store app2 or operating system security stores such as Apples keychain.

[2] Such as 1password

Specifically there is a wide variety of important information that may be stored in the medium to long term which would not be accessed often but is worth a lot to the owner. Forgotten passwords, cryptocurrency wallet keys not used for some time, photos of important documents, important or sensitive private documents in digital form all represent information that are very valuable but which could be easily lost if the access password or the decryption keys are lost, forgotten or stolen.

The described invention is designed to address these issues.

BRIEF DESCRIPTION OF INVENTION

Definitions

The following terms have the meanings defined throughout this specification:

Key: a key is an alphanumeric sequence associated with a digital encryption algorithm. The key is required to either encrypt data utilising the digital encryption algorithm or is required to decrypt data which has been encrypted utilising the digital encryption algorithm. Digital encryption algorithms include AES; in one form a key may be a public key of a public private key pair. In another form the key may be the private key of a public private key pair. In another form the key may be a symmetric key.

User: is an entity which intends to store in a digital storage a data item to a predetermined security level. A user may be a person; a group of persons; a company; a computing system.

ID number: is an alphanumeric sequence which is associated with the data pool at the time of its creation so as to form a link between the user and the data pool. The ID number is used to catalogue each instance of a data pool and any ancillary data associated with the creation of the encrypted data pool from the data pool utilising a digital encryption algorithm. An example of an ID number may be the mobile telephone number associated with/used by the user who/which wishes to store a data item securely and digitally to a predetermined level of confidence. The ancillary data may include a key used in association with the digital encryption algorithm to encrypt the data pool thereby to form the encrypted data pool. The ancillary data may include a key used in association with the digital encryption algorithm to decrypt the encrypted data pool.

Ancillary data: ancillary data is an alphanumeric sequence which is associated with the creation of the encrypted data pool from the data pool utilising a digital encryption algorithm. The ancillary data may include a key used in association with the digital encryption algorithm to encrypt the data pool thereby to form the encrypted data pool. The ancillary data may include a key used in association with the digital encryption algorithm to decrypt the encrypted data pool. The ancillary data may include the algorithm which is utilised to effect the encryption or decryption of the data pool.

Data item: means data of value to the user; the data represented in alphanumeric form; the data may include but is not limited to passwords, crypto currency; crypto currency wallet keys; photos; important documents—in practice anything which is in digital form or a facsimile of it can be represented in digital form.

Proof of identity (ID) data: is data which characterises a user; representable in digital form. It may include photo IDs, phone numbers, of kin names, contact numbers, reference names and contact numbers for the reference names, owners address, birthdate Data Pool: is a digital data record containing at least one data item as well as proof of ID data of a user who/which wishes to store the at least one data item securely.

Encrypted data pool: is a digital data record of the date of pool which has been encrypted utilising a digital encryption algorithm Off-line storage facility: is a facility which is not electronically connected to a networked computing environment. In preferred forms the off-line storage facility may be an analog based storage facility. For example the storage facility may be based on storing information in printed or written form on paper or other non-digital media. In a preferred form the non-digital media may be stored in a secure environment—for example a safety deposit box or an office safe.

In alternative preferred forms the off-line storage facility may be a digital storage facility. In preferred forms such digital storage facility may be stored in an offline condition. For example the digital storage facility may be a USB stick or external hard drive. Its condition of storage will be in a disconnected state—that is not connected to a network either directly or indirectly.

Independent nondigital agent: is an agent which performs the function of accessing data in the encrypted data pool digital storage environment. The independent nondigital agent also performs the function of accessing data in the off-line storage facility. The accessing is performed with reference to the ID number at the instigation of a user or purported user of the encrypted data pool digital storage environment and the off-line storage facility. In particular forms the independent nondigital agent may be a human. In particular forms the independent nondigital agent may be a human which operates in a role of trust. The role of trust may be as a lawyer or security officer.

According to one broad form of the invention there is provided a method of storing at least one Digital data item of a user;

said user characterised by proof of identity data;

said method comprises:

constructing a data pool; said data pool comprising a digital data record which includes said at least one digital data item and said proof of identity data said user associating an ID number selected by the user with the data pool;

encrypting the data pool using a symmetric key of a symmetric encryption algorithm so as to form a symmetric encrypted data pool;

encrypting the symmetric key using a public key of an asymmetric encryption algorithm so as to form an asymmetric encrypted symmetric key;

storing on a server the symmetric encrypted data pool referenced against and together with the ID number and the asymmetric encrypted symmetric key and the public key;

said server selectively connectable to the Internet;

storing in an off-line storage facility the public key and its associated private key.

Preferably, the off-line storage facility is not connected to the Internet.

Preferably, the off-line storage facility is not connectable to a networked computing environment.

Preferably, the off-line storage facility is an analog based storage facility.

Preferably, the off-line storage facility stores information on nondigital media.

Preferably, the off-line storage facility stores information on nondigital media comprising paper.

Preferably, said server selectively connectable by said user to a networked computing environment.

According to another broad form of the invention there is provided a method of recovering said at least one Digital item stored on said server;

said method comprises:

said user providing an independent nondigital agent with said ID number;

said independent nondigital agent accessing said server so as to recover the symmetric encrypted data pool referenced against and together with the ID number and the asymmetric encrypted symmetric key and the public key;

said independent nondigital agent accessing the off-line storage facility thereby to recover from said off-line storage facility the public key and its associated private key;

said independent nondigital agent utilising the private key to decrypt the asymmetric encrypted symmetric key thereby to recover the symmetric key;

said independent nondigital agent utilising the symmetric key and the symmetric encryption algorithm to decrypt the symmetric encrypted data pool so as to recover the data pool;

said independent nondigital agent accessing the proof of identity data contained in the data pool;

said independent nondigital agent communicating with said user which provided said ID number by entering into a communication interaction so as to verify the identity of said user with reference to said proof of identity data to a predetermined level of certainty;

if said independent nondigital agent via said communication interaction verifies the identity of said user to said predetermined level of certainty then said independent nondigital agent communicates said at least one Digital data item to said user.

According to another broad form of the invention there is provided a data security system where;

the data to be secured is encrypted with a symmetric key which is in turn encrypted with an asymmetric public key of an asymmetric key pair;

where the public key is shared with client devices for the purposes of providing the data security service;

but the private key of the server public key pair is stored offline, typically on paper or other non-digital material;

until a lawyer or security officer who has access to the secure data and the server private key is asked by the data owner or their representative to retrieve the data;

where one the pieces of data stored by the system and inside the protected data set is proof of identity information that includes but is not limited to photo id's, phone numbers, next of kin names, contact numbers and relationship, reference names and contact numbers, the owner's address, birth date;

where the information requested for identity verification is typically too complicated and diverse to be automated by an artificial intelligence system and the need for a trained and legally qualified human operator is needed to determine ownership to release and return the protected data.

According to another broad form of the invention there is provided a system where no identity verification, password of personal keys is needed to add data to the pool of secured data, but where identity verification is achieved using identity information that is itself stored as part of the encrypted bundle and is used by security personnel to verify the identity of the owner after data decryption and before returning the unencrypted data to the owner.

In a particular preferred form the system as described above uses a mobile phone number or other unique identifiers as the main means of account identification.

In a further particular preferred form the system as described above allows account owners to add data to their secure account by encrypting the data to be secured using the server public key and identifying the data with a mobile phone number as a unique identifier.

In a particular preferred form the system as described above operates whereby the security operator that has been asked to retrieve secured data has access to the server private key and the secured data and retrieves the data by searching for data related to the specific mobile phone number as an account identifier; subsequently un-encrypts the identity data contained in the account data store and then uses that information during communication directly with the owner or their representative, and upon identity verification releases the data back to the owner.

According to another broad form of the invention there is provided a data security system where;

the data to be secured is encrypted with a symmetric key which is in turn encrypted with two pairs of asymmetric public keys;

where one key pair is generated for use by the server and the second key pair is generated for use by the client;

where the public key of the server is shared with the client device for the purposes of providing the data security service; and it is used in conjunction with the private key from the client key pair to encrypt the symmetric key used to encrypt the data to be stored and protected;

where the private key of the server public key pair is stored offline, typically on paper or other non-digital material;

where the client public key is stored along with the encrypted data and the encrypted symmetric key in a data package that is identified with a unique identifier such as a mobile phone number;

where the client public key and the server private key are needed to decrypt the package symmetric key to in turn decrypt the owners secured data payload;

where the private key generated for the client is destroyed and no longer needed after encryption of the symmetric key since it is not needed to decrypt the data package when the security officer is asked to verify the identity of the owner and retrieve the data at a later time.

In yet a further preferred form there is provided a system where no identity verification, password of personal keys is needed to add data to the pool of secured data, but where identity verification is achieved using identity information that is itself stored as part of the encrypted bundle and is used by security personnel to verify the identity of the owner after data decryption and before returning the unencrypted data to the owner.

In a particular preferred form in a retrieval process the system operates whereby a lawyer or security officer who has access to the secure data, the client public key and the server private key is asked by the data owner or their representative to retrieve the data.

In a further particular preferred form the retrieval process operates whereby once the initial or close to initial pieces of data stored by the system and inside the protected data set is proof of identity information that includes but is not limited to photo id's, phone numbers, next of kin names, contact numbers and relationship, reference names and contact numbers, the owner's address, birth date.

In a particular preferred form the system is suited but not exclusively whereby the information requested for identity verification is typically too complicated and diverse to be automated by an artificial intelligence system and the need for a trained and legally qualified human operator is needed to determine ownership to release and return the protected data.

In yet a further broad form of the invention there is provided a method of storing at least one Digital data item of a user; said user characterised by proof of identity data; said method comprising:

constructing a data pool; said data pool comprising a digital data record which includes said at least one digital data item and said proof of identity data;

said user associating an ID number selected by the user with the data pool;

encrypting the data pool using a symmetric key of a symmetric encryption algorithm so as to form a symmetric encrypted data pool;

encrypting the symmetric key using a public key of an asymmetric encryption algorithm so as to form an asymmetric encrypted symmetric key;

storing on a server the symmetric encrypted data pool referenced against and together with the ID number and the asymmetric encrypted symmetric key and the public key;

said server selectively connectable to the Internet;

storing in an off-line storage facility the public key and its associated private key.

Preferably the symmetric key is encrypted using a multi-sig public key encryption system so as to form an assymetric encrypted symmetric key that results in two or more private keys.

Preferably at least one of the keys is stored offline by a security officer or lawyer.

Preferably at least one or more of the other keys are stored by the user for their own use for retrieval and decryption.

DETAILED DESCRIPTION OF PREFERRED EMBODIMENTS

Figure 1:
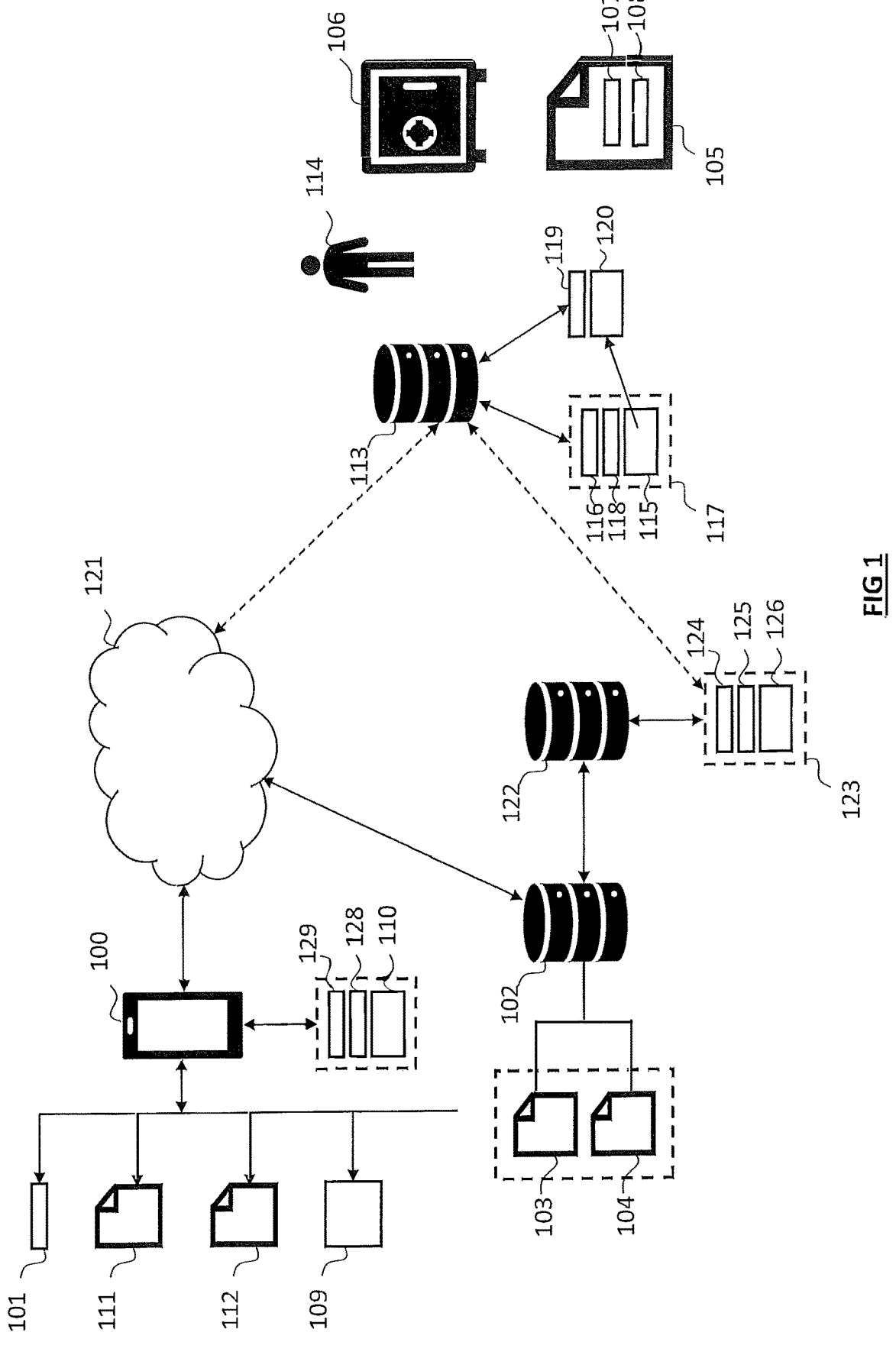
FIG. 1—Main components of first example embodiment

In broad terms the system of embodiments of the present invention includes one or more of the following aspects:

In a first preferred form there is disclosed a data security system where;

the data to be secured is encrypted with a symmetric key which is in turn encrypted with an asymmetric public key of an asymmetric key pair;

where the public key is shared with client devices for the purposes of providing the secure storage service;

but the private key of the server public key pair is stored offline, typically on paper or other non-digital material;

until a lawyer or security officer who has access to the secure data and the server private key is asked by the data owner or their representative to retrieve the data;

Where one the initial or close to initial pieces of data stored by the system and inside the protected data set is proof of identity information that includes but is not limited to photo id's, phone numbers, next of kin names, contact numbers and relationship, reference names and contact numbers, the owner's address, birth date;

where the information requested for identity verification is typically too complicated and diverse to be automated by an artificial intelligence system and the need for a trained and legally qualified human operator is needed to determine ownership to release and return the protected data.

In a further preferred form there is provided a system where no identity verification, password of personal keys is needed to add data to the pool of secured data, but where identity verification is achieved using identity information that is itself stored as part of the encrypted bundle and is used by security personnel to verify the identity of the owner after data decryption and before returning the unencrypted data to the owner.

In a particular preferred form the system as described above uses a mobile phone number or other unique identifiers as the main means of account identification.

In a further particular preferred form the system as described above allows account owners to add data to their secure account by encrypting the data to be secured using the server public key and identifying the data with a mobile phone number as a unique identifier.

In a particular preferred form the system as described above operates whereby the security operator that has been asked to retrieve secured data has access to the server private key and the secured data and retrieves the data by searching for data related to the specific mobile phone number as an account identifier; subsequently un-encrypts the identity data contained in the account data store and then uses that information during communication directly with the owner or their representative, and upon identity verification releases the data back to the owner.

In another preferred form there is provided a data security system where;

the data to be secured is encrypted with a symmetric key which is in turn encrypted with two pairs of asymmetric public keys;

Where one key pair is generated for use by the server and the second key pair is generated for use by the client;

where the public key of the server is shared with the client device for the purposes of providing the data security service; and it is used in conjunction with the private key from the client key pair to encrypt the symmetric key used to encrypt the data to be stored and protected;

where the private key of the server public key pair is stored offline, typically on paper or other non-digital material;

Where the client public key is stored along with the encrypted data and the encrypted symmetric key in a data package that is identified with a unique identifier such as a mobile phone number;

Where the client public key and the server private key are needed to decrypt the package symmetric key to in turn decrypt the owners secured data payload.

Where the private key generated for the client is destroyed and no longer needed after encryption of the symmetric key since it is not needed to decrypt the data package when the security officer is asked to verify the identity of the owner and retrieve the data at a later time.

In yet a further preferred form there is provided a system where no identity verification, password of personal keys is needed to add data to the pool of secured data, but where identity verification is achieved using identity information that is itself stored as part of the encrypted bundle and is used by security personnel to verify the identity of the owner after data decryption and before returning the unencrypted data to the owner.

In a particular preferred form in a retrieval process the system operates whereby a lawyer or security officer who has access to the secure data, the client public key and the server private key is asked by the data owner or their representative to retrieve the data.

In a further particular preferred form the retrieval process operates whereby once the initial or close to initial pieces of data stored by the system and inside the protected data set is proof of identity information that includes but is not limited to photo id's, phone numbers, next of kin names, contact numbers and relationship, reference names and contact numbers, the owner's address, birth date.

In a particular preferred form the system is suited but not exclusively whereby the information requested for identity verification is typically too complicated and diverse to be automated by an artificial intelligence system and the need for a trained and legally qualified human operator is needed to determine ownership to release and return the protected data.

Process Description

The above generalized statements of the system for saving and retrieving precious digital data may be given effect in accordance with one or more of the following examples:

First Example Embodiment

With reference to FIG. 1 a first embodiment is a client server based service where the user wants to encrypt and store important information and does not want to have to remember complicated passwords, worry about hacking or loss or destruction of devices. Or the saving of passwords in their home or other safe place. The service has two processes. One for encryption and saving of data and the other for decryption and retrieval of data.

The process of encryption and storing of data is as follows:

1. The server 102 generates a public key pair 103 104 where the private key 103 is stored offline 107 typically in a non digital form such as a paper print out 105 in a vault or safe 106 of the service company or law firm. The paper print out 105 usually also has the corresponding public key for the private key 107 printed on the same paper. Both stored keys 107 108 correspond to the key pair generated on the server 103 104 but where the private key 103 on the server is destroyed after storage on paper 107.

2. The public key of the key pair 104 is used for all customers of the service to encrypt 110 their data 109 on their client devices 100 using public key encryption techniques.

3. Each time a customer encrypts 110 their data 109 the following technique is used:

a. The client generates a symmetric key 111.

b. The data to be encrypted 109 is first encrypted 110 with this symmetric key 111 (such as AES). This is done because public key encryption itself cannot typically store large amounts of data.

c. In turn the symmetric key 111 is encrypted 128 with the server's public key 112 which is communicated with using a public network such as the Internet 121 which was copied from the server 104.

4. The package to be sent to the server and saved 122 includes:

a. The main encrypted data bundle 110 123 which was encrypted with the client symmetric key 111.

b. The encrypted symmetric key 111 125 which was encrypted with the server's public key 112 104.

c. A unique customer identifier 101 124 129 such as a mobile phone number 101 118 which is used for later retrieval.

5. The server 102 accepts the package and securely saves 122 the package 123 for later retrieval The customer does not need to save or store any password or keys at this time. For retrieval all they need is to quote a mobile number 101 to initiate the retrieval process.

The process of retrieval and decryption of data and supply of the data back to the owner is as follows:

1. The user wants to initiate a retrieval.

2. The user accesses the storage system via their device 100 and uses their unique identifier such as their mobile phone number 101 to initiate a retrieval order. The mobile phone 101 number is not a secret. It is simply an identifier for the purposes of finding and retrieving the right data packages from storage.

3. The server system 102 receives the order and notifies a security officer or lawyer 114 that the customer wishes to retrieve their secured data 123.

4. The security officer or lawyer 114 uses the owners mobile phone number 101 124 to find 123 and retrieve 117 the owners encrypted data 123 from the servers secure storage 122.

5. The security officer 114 secures the computer they are using 113.

6. The security officer 114 retrieves the private key 107 for the server from safe storage 106.

7. Using their secure device 113 the security officer decrypts the data 117 related to the account of the user that has requested retrieval. The officer does this by:

a. Using the retrieved server private key 107 to decrypt 119 the symmetric key 116 for each bundle 117 of encrypted data. The symmetric key 119 for each bundle is different in each case.

b. In turn the unencrypted symmetric key for each bundle is used to decrypt 120 the main data file 115 of each bundle.

8. At least one of the bundles 117 unencrypted and associated with the customer unique identifier, namely the mobile phone number 118 101 contains identifying information that will help the security officer determine and verify the identity of the owner or the owner's representative. This identity data may include but not be limited to:

a. photo id's, such as drivers license and passport b. phone numbers, c. next of kin names, contact numbers and relationship, d. reference names and contact numbers, e. the owner's address, f. birth date;

9. The security officer 114 then contacts the owner 100 by phone or video conference and uses the identity information contained in at least one of the stored bundles 117 to verify the owners identity and then;

10. The owner and the security office 114 agree on the method of communication 127 to be used to retrieve the data.

11. The security officer uploads the unencrypted secure data 120 to the owner 100. Typically this would be a secure communications channel such as WhatsApp, Signal or Telegram or some other end to end secure communications channel.

12. Typically the security officer 114 would delete and destroy the owner's unencrypted data 120 from their decryption device 113 after the decryption session.

Figure 3:
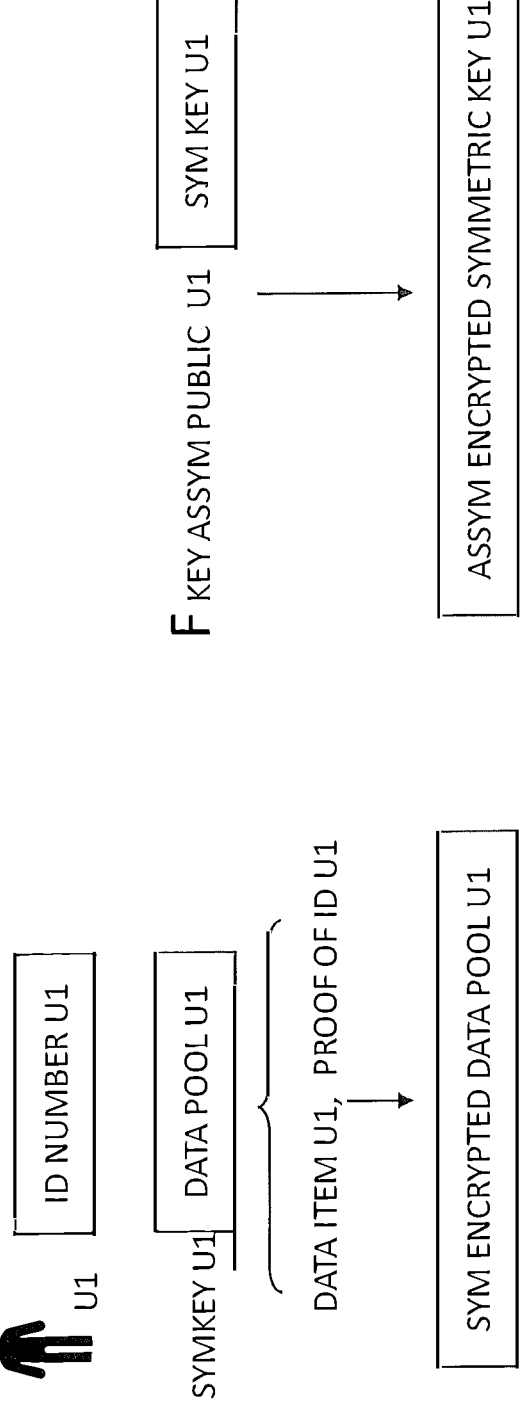
FIG. 3 is a block diagram of data storage scenario arising from use of the system of FIG. 1.
Figure 4:
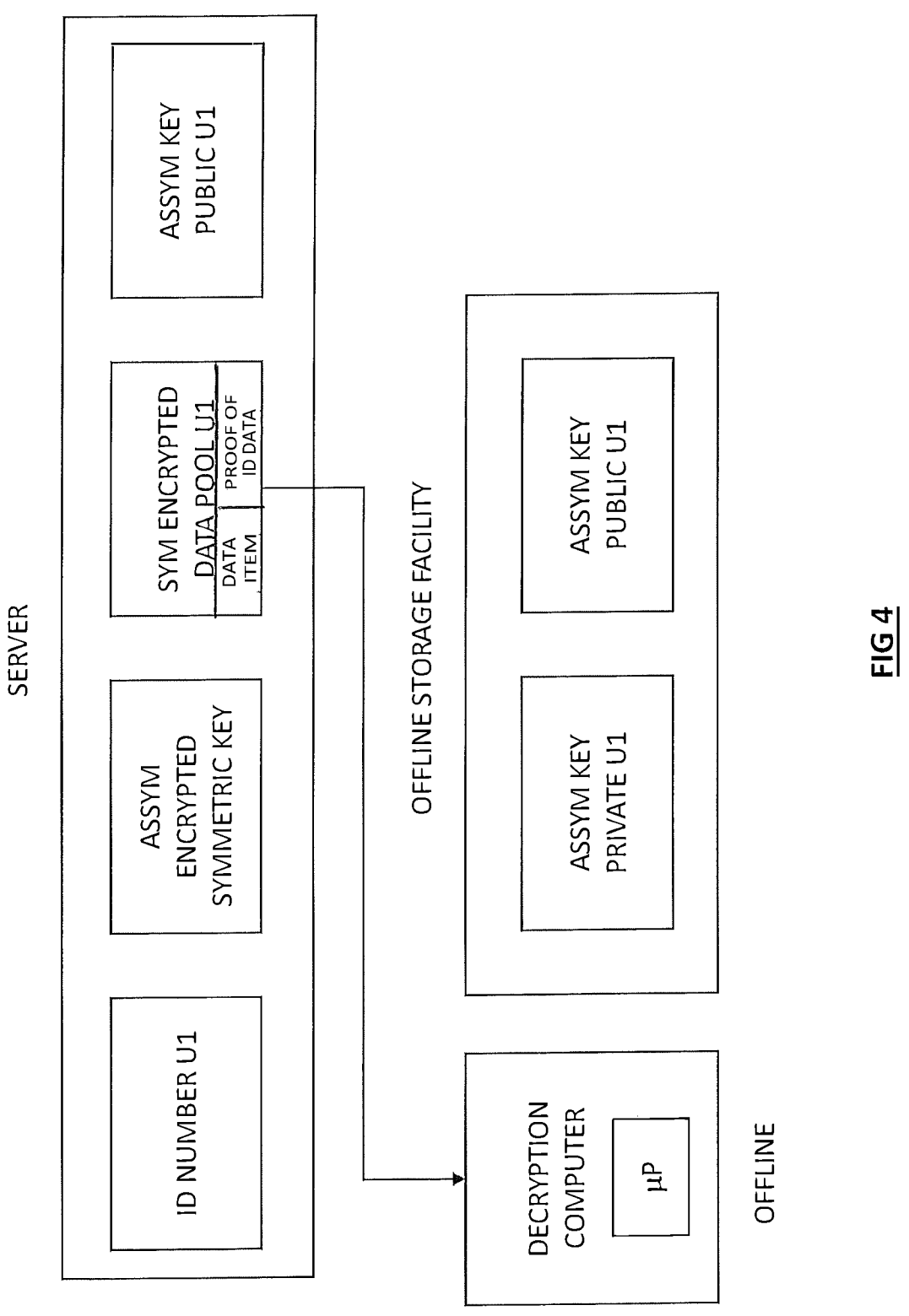
FIG. 4 is a generalised block diagram of data storage scenario arising from use of the system of FIG. 1.

FIGS. 3 and 4 illustrate diagrammatically the storage arrangement of this embodiment where like components are numbered as for FIG. 1.

Second Example Embodiment

Figure 2:
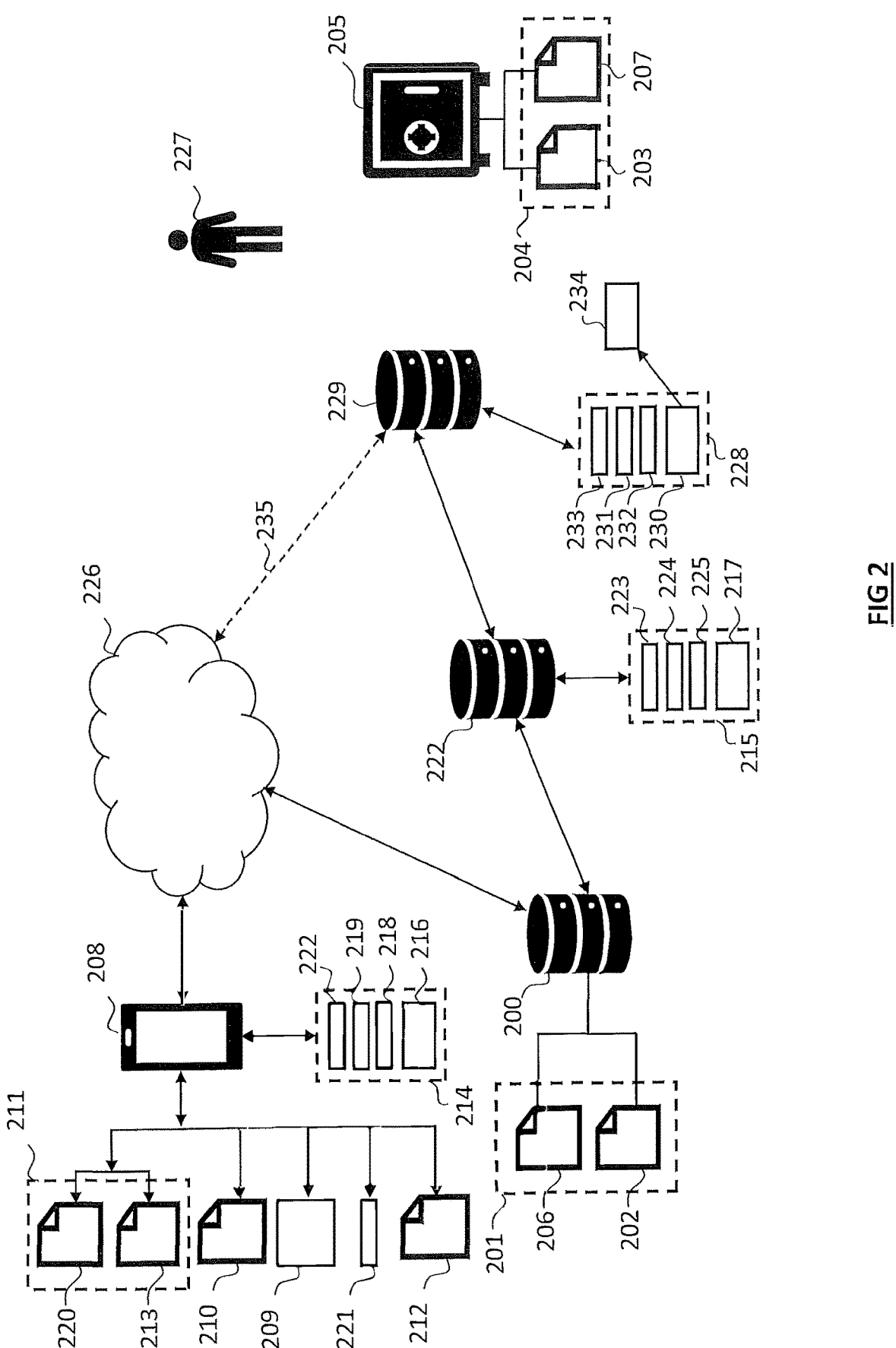
FIG. 2—Main components of the second example embodiment

With reference to FIG. 2 a second example embodiment is the same as the first embodiment except that the second embodiment uses two sets of public key pairs in the process.

The process of encryption and storing of data is as follows:

1. The server 200 generates a public key pair 201 where the key pair 201 204 and especially the private key 202 203 is stored offline typically in a non digital form such as a paper print out in a vault or safe 205 of the service company or law firm.

2. The public key 206 207 of the key pair 201 204 is used as one part in two key components for all customers of the service to encrypt their data on their client devices 208 using public key encryption techniques.

3. Each time a customer encrypts their data 209 the following technique is used:

a. The client generates a symmetric key 210.

b. The client also generates its own public key pair 211 comprising private 213 and public 220 keys.

c. The data to be encrypted 209 is first encrypted with this symmetric key 210 (such as AES). This is done because public key encryption itself cannot typically store large amounts of data.

d. In turn the symmetric key 210 is encrypted with a copy of the server's public key 206 207 and the client's private key 213 using public key encryption techniques that are known in the art.

4. The package to be sent to the server 200 and saved 215 includes:

a. The main encrypted data bundle 216 217 which was encrypted with the client symmetric key 210.

b. The encrypted symmetric key 218 225 which was encrypted with a copy of the server's public key 212 and the clients private key 213.

c. A copy 219 224 of the clients public key.

d. A unique customer identifier such as a mobile phone number 221 222 223 which is used for later retrieval.

5. The server 200 accepts the package 214 215 and securely saves the package in server storage 222 for later retrieval.

6. Once the saving of the data is confirmed the client side private key 213 is permanently destroyed as it will no longer be needed to decrypt the package at a later date. This is because the symmetric key 210 that is encrypted 218 with the server public key 212 and the client private key 220 219 can be decrypted by the client public key 219 (which is stored with the bundle) and the server private key 203 which will be retrieved from safe storage 205 when a request for decryption has been made by the owner.

The customer does not need to save or store any password or keys at this time. For retrieval all they need is a mobile number to initiate the retrieval process.

The process of retrieval and decryption of data and supply of the data back to the owner is as follows:

1. The user wants to initiate a retrieval.

2. The user using their device of choice 208 accesses the storage system over a public network such as the Internet 226 and uses their unique identifier such as their mobile phone number 221 to initiate a retrieval order. The mobile phone number is not a secret. It is simply an identifier for the purposes of finding and retrieving the right data packages from storage.

3. The server system 200 receives the order and notifies a security officer or lawyer 227 of the customers wish to retrieve their secured data 215.

4. The security officer or lawyer 227 uses the owners mobile phone number 223 to find 215 and retrieve 228 the owners encrypted data from the servers secure storage.

5. The security officer secures the computer 229 they are using.

6. The security officer 227 retrieves the private key 203 for the server from safe storage 205.

7. The security officer 227 decrypts the data 230 related to the account of the user that has requested retrieval. The officer does this by:

a. Using the retrieved server private key 203 and the retrieved client public key 231 (that is part of every stored bundle 228 using the second embodiment) to decrypt the symmetric key 232 for each bundle of encrypted data 228. The symmetric key for each bundle 232 is different in each case.

b. In turn the unencrypted symmetric key 232 for each bundle is used to decrypt the main data file 230 of each bundle and make it readable 234 in an unencrypted state.

8. At least one of the bundles unencrypted and associated with the customer unique identifier, namely the mobile phone number 233 contains identifying information that will help the security officer determine and verify the identity of the owner or the owner's representative. This identity data may include but not be limited to:

a. photo id's, such as drivers license and passport b. phone numbers, c. next of kin names, contact numbers and relationship, d. reference names and contact numbers, e. the owner's address, f. birth date;

9. The security officer 227 then contacts the owner by phone or video conference and uses the identity information to verify the owners identity and then;

10. The owner and the security office 227 agree on the method of communication 235 to be used to retrieve the data.

11. The security officer uploads the unencrypted secure data 234 to the owner. Typically this would be a secure communications channel 235 such as WhatsApp, Signal or Telegram or some other end to end secure communications channel.

12. Typically the security officer would delete and destroy the owners unencrypted data 234 after the decryption session.

IN USE EXAMPLES

Example 3

Figure 5:
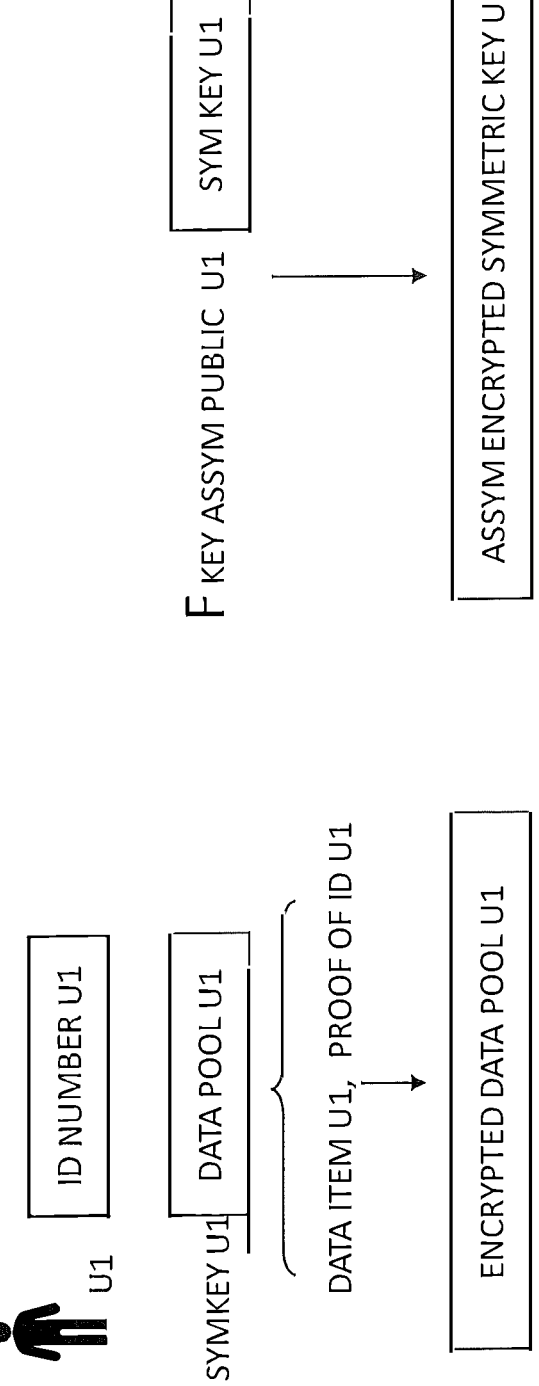
FIG. 5 is a block diagram of data storage scenario arising from use of the system of FIG. 1.
Figure 6:
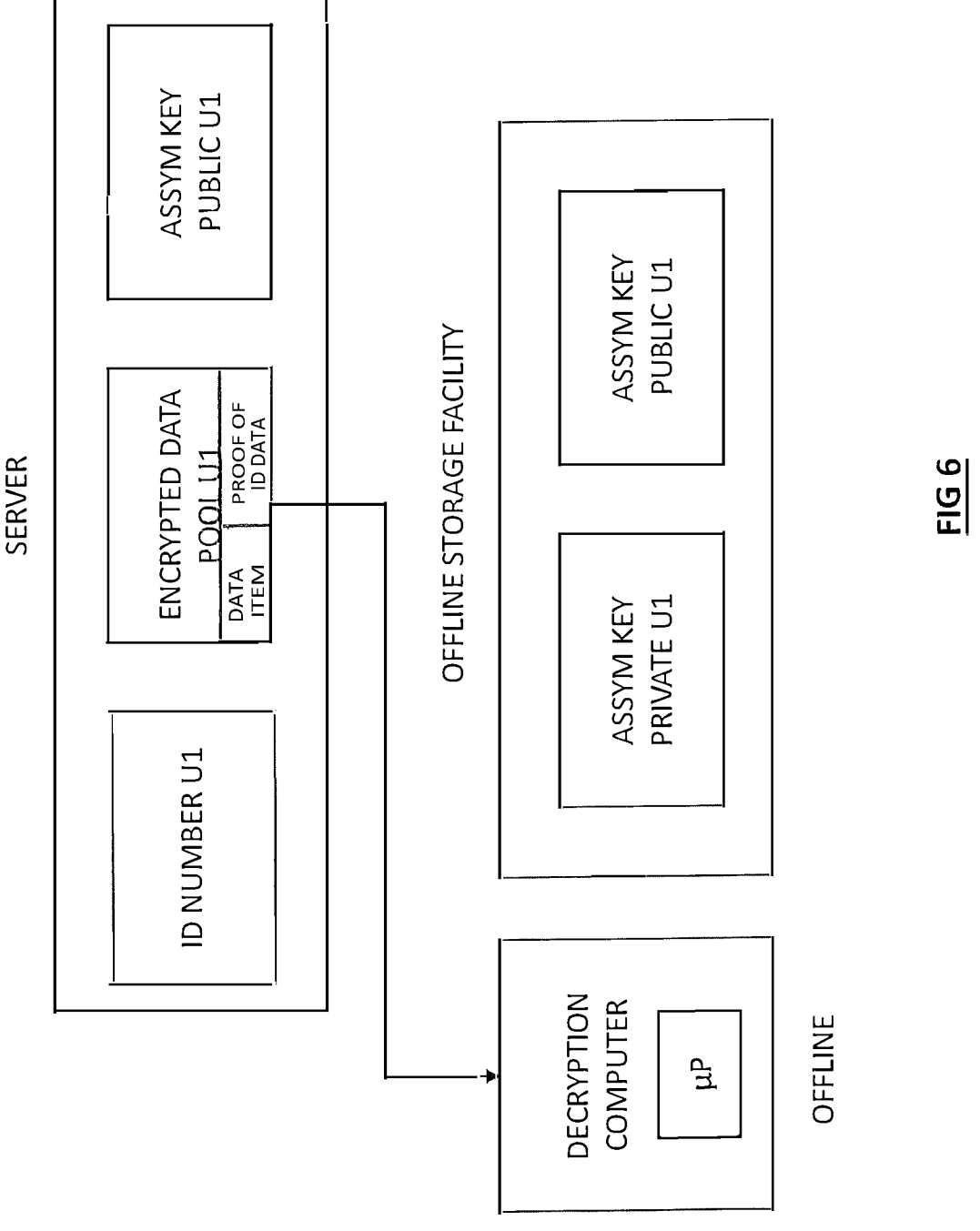
FIG. 6 is a generalised block diagram of data storage scenario arising from use of the system described in IN USE example 1.

With reference to FIGS. 5 and 6 there is illustrated an example scenario of use of an embodiment of the present invention:

Store

A user U1 wishes to store data pool U1 utilising ID number U1.

Step one: user U1 assembles data pool U1 preferably in the form of a digital data record. The digital data record includes at least one data item and proof of ID data U1.

The at least one data item and proof of ID data U1 may be stored as separate elements.

Step one may be repeated whereby multiple different or additional ones of the at least one data item and proof of ID data U1 may be stored at any time.

Step 2 user U1 encrypts the data pool U1 utilising an encryption algorithm U1 and an associated encryption key U1 to form encrypted data pool U1.

Step 3 user U1 causes the encrypted data pool U1 to be stored digitally referenced against ID number U1 in an encrypted data pool digital storage environment. In a preferred form the encrypted data pool is stored in a server environment.

Step 4 user U1 communicates the encryption algorithm U1 and a decryption key U1 to an off-line storage facility which stores the encryption algorithm U1 and the decryption key referenced against ID number U1. In a preferred form the off-line storage facility stores these items in analog form. In a particular preferred form the analog form is written on paper form.

Step 5 an independent nondigital agent is granted authorisation to access the encrypted data pool digital storage environment. The independent nondigital agent is also granted access to the off-line storage facility. In particular the agent is granted authority to access the data in either or both the encrypted data pool digital storage environment or the off-line storage facility as a function of the identity number U1.

Step 6 in a preferred step the user U1 causes any key associated with the creation of the encrypted data pool U1 to be deleted (excluding any such key stored in either or both of the encrypted data pool digital storage environment or the off-line storage facility.

[In a particular preferred form a first and second digital encryption algorithm is utilised in a two-step process. In a preferred form the first digital encryption algorithm is utilised to encrypt and compress the at least one data item U1. In a further particular preferred form a key associated with the first digital encryption algorithm is encrypted by the second digital encryption algorithm thereby to form an encrypted key U1. Preferably the encrypted key U1 is stored with the encrypted data pool U1 and indexed against the ID number U1.]

Retrieve

A user U1 wishes to retrieve the data pool U1 which was stored utilising ID number U1 (and which is understood has been stored as encrypted data pool U1 in the encrypted data pool digital storage environment Step 1 user U1 communicates ID number U1 to the independent nondigital agent.

Step 2 the independent nondigital agent accesses the off-line storage facility so as to locate key U1 stored against ID number U1.

Step 3 the independent nondigital agent accesses the encrypted data pool digital storage environment so as to locate encrypted data pool U1 stored against ID number U1.

Step 4 independent nondigital agent utilises a digital processor to decrypt the encrypted data pool U1 by use of key U1 in association with digital encryption algorithm U1 so as to recover data pool U1 as recovered data pool U1.

Step 5 the independent nondigital agent accesses at least the proof of ID data U1 in a verified U1 step. The independent nondigital agent communicates with user U1 to verify that one or more aspects of user U1 match corresponding one or more aspects of user U1 found by the independent nondigital agent in the proof of ID data U1 which is contained in the recovered data pool U1.

Step 6 if the independent nondigital agent verifies the one or more aspects of user U1 to a predetermined level of certainty then the independent nondigital agent releases the recovered data pool you 12 user one in a release U1 step.

ALTERNATIVE EMBODIMENTS

The example embodiment uses a single public key pair and symmetric key encryption to protect the uploaded data. The second example uses dual client and server side key pairs and symmetric keys to protect the uploaded date. Any public key method could be used such as Shamir's algorithm or any flavour of public key algorithm could be used.

The example embodiments use a security officer or a lawyer to verify the identity of the person requesting retrieval of information. In an alternative embodiment anyone with security training or an artificial intelligence algorithm could be used to verify the identity of the person requesting retrieval of stored information.

In the example embodiments the server side master private keys are stored on paper in a vault or safe. An alternative embodiment could use any offline storage medium including but not limited to a USB memory stick, etched metal, QR code representations on paper or barcodes.

In the example embodiment secure delivery back to the requesting user after identity verification includes secure communications channels such as Whatsapp, Signal and Telegram. An alternative embodiment could use any communications channel including but not limited to verbal communication, unencrypted email, web download or SMS.

The example embodiments have the master public key pairs being generated on the server. In an alternative embodiment the key pairs could be generated anywhere.

DeepFreeze and Alternative Embodiment

The example embodiment discloses a deep storage system where a public key pair is used to secure sensitive data by storing the private key offline in a vault or safe and possibly in a printed form in the custody of a professional, such as a professional privacy or security officer or a lawyer.

Figure 7:
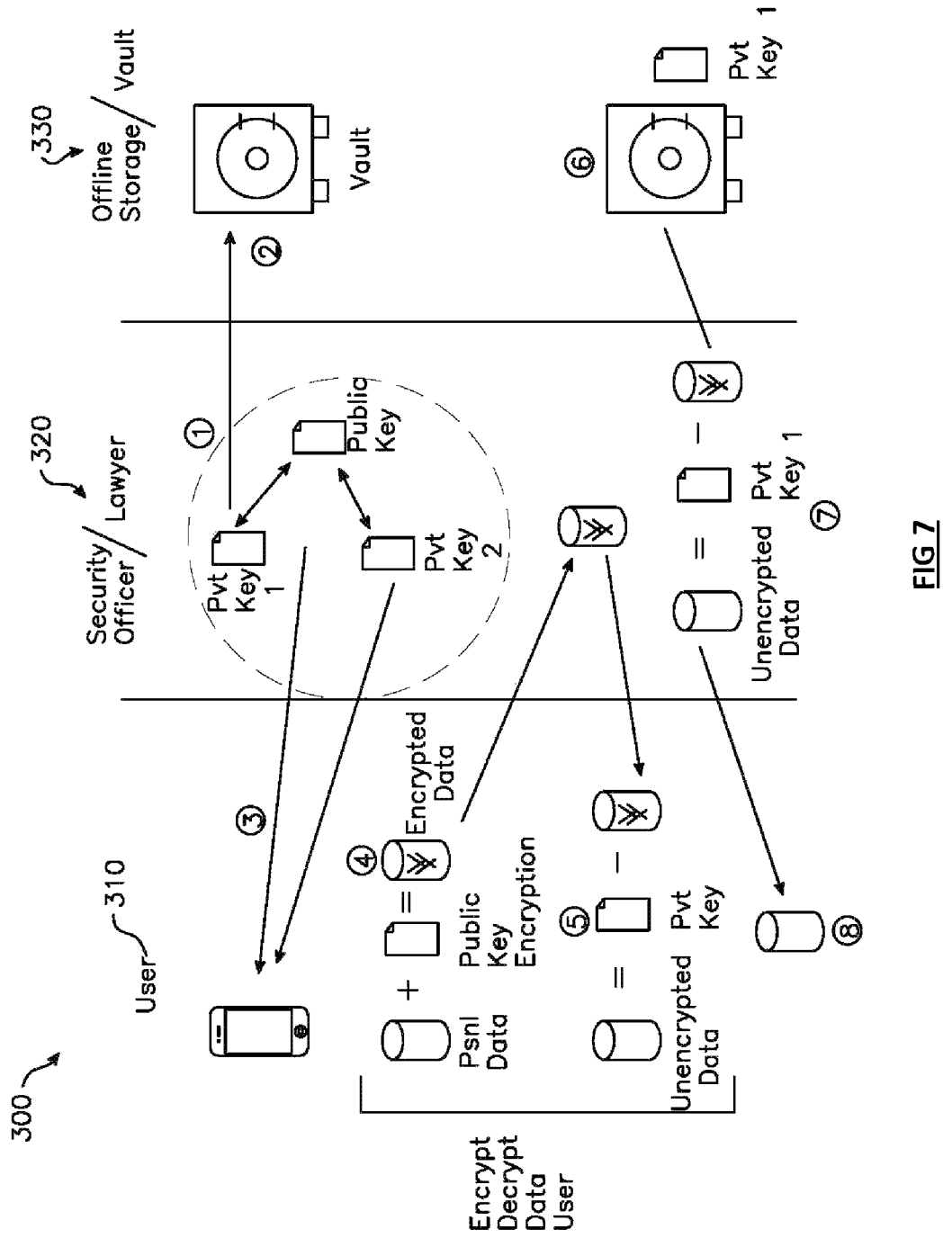
FIG. 7 is a block diagram of an alternative embodiment.

With reference to FIG. 7 there is illustrated an alternative embodiment which may use a multi-signature key pair where the encrypted data can be decrypted by one of a number of private keys, so that the owner or operator for the account can retrieve the stored data and decrypt it using their own private key; and/or optionally use a professional security or legal service to retrieve their private key from cold storage in a vault or safe and decrypt the same data.

With reference to FIG. 7 there is illustrated a secure storage system 300 conceptually showing the steps of interaction between a user 310, an independent non-digital agent 320 and offline storage 330.

The security officer or lawyer generates a multi-signature key pair step 1 as known in the art where one or the other of the private keys are needed to decrypt data that has been encrypted with the corresponding public key.

Private key 1 is stored offline step 2 in the officers/lawyers vault

Private key 2 and the public key are sent to the user step 3 for use in encrypting and subsequent decryption of the data to be protected.

During encryption step 4, the user uses the public key to encrypt the data to be stored and sends it to the security officer or lawyer for storage (or their secure storage facility)

In the event the user wants to access the data private key 2 is used to decrypt the data step 5 to allow the data to be used.

In the event that the user's private key is not available (private key 2) the user or their representative can have the security officer retrieve the private key (private key 1) step 6 from offline storage in the vault or equivalent and then;

Use that private key step 7 to decrypt the encrypted data stored on the security officer or lawyers secure storage to produce unencrypted personal data and then transfers it to the user.

This scenario is helpful where a user wishes to use cold storage in the event that they forget or lose their own private keys or in the event of a bad mishap in which a representative or even executor of the user can appeal to the lawyer or security officer to obtain access to the encrypted data.

The alternate embodiment would have practical benefit where the data owner wants to be able to obtain personal access to the encrypted data but wishes to allow a lawyer or security officer to get access to the data in the event that the personal private key is lost, damaged or forgotten or access is lost due to loss of life of the owner and the owners executor wishes to access the data as the administrator of the former owner's estate.

The invention claimed is:

1. A method for securely storing at least one digital data item of a user, the method comprising:
  generating a data pool comprising:
  at least one digital data item of the user, and
  proof of identity data uniquely associated with the user and coupled with the at least one digital data item;
  associating a user-selected identifier with the data pool;
  generating an encryption key pair comprising a public key and a private key;
  encrypting the data pool using a symmetric encryption algorithm and a symmetric key to produce an encrypted data pool;
  encrypting the symmetric key using an asymmetric encryption algorithm and the public key to produce an encrypted symmetric key;
  storing the encrypted data pool, the encrypted symmetric key, the user-selected identifier, and the public key on a server that is selectively connectable to a networked environment;
  storing the private key, associated with the public key, in a physically offline storage facility inaccessible to digital systems, wherein the offline storage facility comprises nondigital or analog storage media; and
  enabling access to the private key only via identity verification conducted by an independent nondigital agent, wherein the identity verification is performed based on a requesting party's knowledge of the at least one digital item and associated proof of identity data, and does not require a password, passphrase, or other retained secret.

2. The method of claim 1, wherein the private key is stored on a nondigital medium.

3. The method of claim 1, wherein the independent nondigital agent is a trusted third party selected from the group consisting of a lawyer, a privacy officer, and a security officer.

4. The method of claim 1, wherein the verification of the user's identity by the independent nondigital agent includes a direct human-to-human interaction based on knowledge of encrypted content, enabling access without any retained password or biometric identifier.

5. The method of claim 1, wherein the proof of identity data comprises information inherently recognizable to the user, selected from the group consisting of: personal photographs, phone numbers, family names, addresses, and birthdates.

6. The method of claim 1, wherein the data pool is configured to require and enable the independent nondigital agent to authorize access to the requesting party without authorization from the user.

7. A system for securely storing at least one digital data item of a user, the system comprising:

a data construction module configured to generate a data pool comprising:

at least one digital data item of the user, and proof of identity data uniquely associated with the user, embedded within the same encrypted payload as the data item;

an identifier module configured to associate a user-selected identifier with the data pool;

a symmetric encryption module configured to encrypt the data pool using a symmetric encryption algorithm and a symmetric key to generate an encrypted data pool;

an asymmetric encryption module configured to encrypt the symmetric key using a public key of an asymmetric encryption algorithm to generate an encrypted symmetric key;

a server configured to store the encrypted data pool, the encrypted symmetric key, the public key, and the user-selected identifier, the server being selectively connectable to a networked environment;

an offline storage facility, physically isolated from digital systems, configured to store the private key associated with the public key on nondigital or analog storage media;

an identity verification interface configured to allow an independent nondigital agent to access the offline storage facility and verify the requester's identity based on their knowledge of the encrypted content and embedded proof of identity, without requiring a password, passphrase, or other retained secret.

8. The system of claim 7, wherein the private key is stored on a nondigital medium.

9. The system of claim 7, wherein the independent nondigital agent is a trusted third party selected from the group consisting of a lawyer, a privacy officer, and a security officer.

10. The system of claim 7, wherein the verification of the user's identity by the independent nondigital agent includes a direct human-to-human interaction based on knowledge of encrypted content, enabling access without any retained password or biometric identifier.

11. The system of claim 7, wherein the embedded proof of identity comprises information inherently recognizable to the user, selected from a group consisting of: personal photographs, phone numbers, family names, addresses, and birthdates.

12. The system of claim 7, wherein the data pool is configured to require and enable the independent nondigital agent to authorize access to the requesting party without authorization from the user.

\* \* \* \* \*